United States Patent
Uyeki

(10) Patent No.: US 9,401,610 B2
(45) Date of Patent: Jul. 26, 2016

(54) SYSTEM AND METHOD FOR ELECTRIC VEHICLE BATTERY CHARGING

(71) Applicant: Honda Motor Co., Ltd., Minato-ku, Tokyo (JP)

(72) Inventor: Robert Uyeki, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 495 days.

(21) Appl. No.: 14/031,749

(22) Filed: Sep. 19, 2013

(65) Prior Publication Data

US 2015/0077054 A1 Mar. 19, 2015

(51) Int. Cl.
*H02J 7/00* (2006.01)
*H01M 10/44* (2006.01)
*B60L 3/12* (2006.01)
*B60L 11/18* (2006.01)

(52) U.S. Cl.
CPC ................. *H02J 7/0052* (2013.01); *B60L 3/12* (2013.01); *B60L 11/184* (2013.01); *B60L 11/185* (2013.01); *B60L 11/1816* (2013.01); *B60L 11/1842* (2013.01); *B60L 11/1844* (2013.01); *B60L 11/1846* (2013.01); *B60L 11/1848* (2013.01); *B60L 11/1861* (2013.01); *B60L 2240/622* (2013.01); *B60L 2240/662* (2013.01); *B60L 2240/665* (2013.01); *B60L 2240/70* (2013.01); *B60L 2240/80* (2013.01); *B60L 2260/50* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/169* (2013.01); *Y04S 10/126* (2013.01); *Y04S 30/14* (2013.01)

(58) Field of Classification Search
CPC ........................ B60L 11/1838; H02J 7/0052
USPC .................. 320/101, 104, 109, 137
See application file for complete search history.

(56) References Cited

U.S. PATENT DOCUMENTS

| | | | | |
|---|---|---|---|---|
| 6,732,019 | B2 * | 5/2004 | Spool | G06Q 30/02 340/870.02 |
| 8,278,881 | B2 | 10/2012 | Woody et al. | |
| 8,305,032 | B2 | 11/2012 | McKenna | |
| 8,450,967 | B2 | 5/2013 | Lowenthal et al. | |
| 2003/0041038 | A1 * | 2/2003 | Spool | G05B 19/042 705/412 |
| 2008/0046387 | A1 | 2/2008 | Gopal et al. | |
| 2009/0210357 | A1 | 8/2009 | Pudar et al. | |
| 2010/0179893 | A1 * | 7/2010 | Burke | G06Q 30/04 705/31 |
| 2011/0144823 | A1 | 6/2011 | Muller et al. | |
| 2011/0258112 | A1 * | 10/2011 | Eder | B60L 11/1809 705/39 |
| 2011/0270476 | A1 | 11/2011 | Doppler et al. | |
| 2012/0130556 | A1 | 5/2012 | Marhoefer | |
| 2012/0150359 | A1 | 6/2012 | Westergaard | |
| 2012/0169283 | A1 | 7/2012 | Lowenthal et al. | |
| 2012/0271686 | A1 | 10/2012 | Silverman | |
| 2012/0293077 | A1 | 11/2012 | Tousain et al. | |
| 2012/0309455 | A1 | 12/2012 | Klose et al. | |

(Continued)

*Primary Examiner* — M'Baye Diao
(74) *Attorney, Agent, or Firm* — Arent Fox LLP

(57) ABSTRACT

Systems and methods that facilitate the charging of an electric vehicle battery while avoiding electric grid peak load difficulties are discussed. One such method may include generating charge instructions based on a historical load profile, forecast load profile, historical weather data, and/or forecast weather data, in the absence of real-time grid condition information.

19 Claims, 8 Drawing Sheets

(56) References Cited

U.S. PATENT DOCUMENTS

| | | | |
|---|---|---|---|
| 2013/0002188 A1* | 1/2013 | Uyeki | H01M 10/44 320/101 |
| 2013/0015809 A1 | 1/2013 | Frey et al. | |
| 2013/0035992 A1 | 2/2013 | Silverman | |
| 2013/0049677 A1 | 2/2013 | Bouman | |
| 2013/0049703 A1 | 2/2013 | Perisic et al. | |
| 2013/0103191 A1 | 4/2013 | Bouman | |
| 2013/0134780 A1 | 5/2013 | Parsonnet | |
| 2014/0070756 A1* | 3/2014 | Kearns | H02J 7/007 320/101 |

* cited by examiner

SYSTEM AND METHOD FOR ELECTRIC VEHICLE BATTERY CHARGING

BACKGROUND

Electric vehicles, including battery electric vehicles and plug-in hybrid electric vehicles, provide a new opportunity to reduce oil consumption by drawing power from the electric grid. As electric vehicle ownership continues to expand, the load on the power grid will increase and power consumption patterns will be altered. Even a low level of electric vehicle adoption could strain the electric infrastructure, particularly in residential areas where as much as eighty to ninety percent of electric vehicle charging is expected to occur. The habits of electric vehicle owners could pose a challenge for electricity providers.

Electric vehicles are likely to have a more significant effect on the electric distribution network than on the generation or transmission systems. The distribution system moves power from the transmission system to end-use customers and includes local distribution lines, transformers, and other equipment to transform high-voltage power into the lower voltage power carried to electric customers. Clustering of plug-in electric vehicles in residential neighborhoods could potentially necessitate the replacement of equipment in the power distribution system. Smaller residential transformers could exceed their design limits if multiple plug-in electric vehicles operate on a single transformer.

Practically speaking, electricity cannot be easily stored on a large scale. As a result, supply and demand must remain in balance in real time. Traditionally utilities have leveraged peaking power plants to increase power generation to meet demand. Demand response works from the other side of the equation, instead of adding more generation to the system, energy users are offered incentives to reduce consumption. Demand response entails customers changing their normal consumption patterns in response to changes in the price of energy over time or to incentive payments designed to induce lower electricity use when prices are high or system reliability is in jeopardy.

Utilities pay for demand response capacity because it is typically less costly and easier to procure than traditional generation. Demand response allows energy users of all kinds to add stability to the power grid by voluntarily lowering their demand for electricity. By aligning the available supply of electricity with the value of electricity to customers at a given point in time, demand response programs increase the efficiency of electricity production. However, to fully harness the benefits associated with demand response programs, customers need access to real-time information from the utility. When communications between the utility and the customer are unavailable, the benefits associated with demand response systems are greatly diminished.

Electric vehicle adoption will have a significant impact on utilities and the power grid. It is important that electric vehicle charging be managed to avoid peak load problems and to help keep the power grid stable.

SUMMARY

The following presents a simplified summary of the disclosure in order to provide a basic understanding of certain aspects of the disclosure. This summary is not an extensive overview of the disclosure. It is not intended to identify key/critical elements of the disclosure or to delineate the scope of the disclosure. Its sole purpose is to present certain concepts of the disclosure in a simplified form as a prelude to the more detailed description that is presented later.

The disclosure disclosed and claimed herein, in one aspect thereof, includes systems and methods that facilitate the charging of an electric vehicle battery, while avoiding electric grid peak load difficulties, in the absence of current (e.g. real-time) electric grid condition information. One such method may include the acts of coupling an electric vehicle battery to a power source utilizing a charger and generating charge instructions based on a historical load profile, historical temperature data and/or historical solar load data, and providing the charge instructions to the charger. The charge instructions may be calculated in the absence of real-time grid load data. Such a method may also include the acts of basing charging instructions on a temperature and solar load forecast instead of historical data when the temperature or solar load forecast varies from the historical temperature data by a predetermined amount.

In another aspect, the disclosure may include systems for charging an electrical vehicle battery in the absence of utility demand response or present electric grid condition data, for example, when utility demand response or electric grid condition data are unavailable. One example system may include a battery charger coupled to a power source for supplying power to the rechargeable battery, a database including historical load profile, historical and forecast temperature data and historical and forecast solar load data, a charging control component in communication with the battery charger and the database, charging instructions generated by the charging control component and provided to the battery charger. The charging instructions may be based on the historical load profile, historical and/or temperature data and historical and/or forecast solar load data.

Utilizing the disclosed system and methods, a strategy for charging an electric vehicle battery may be generated taking into account a calculated electric grid condition when real-time grid condition or demand response information is unavailable.

To the accomplishment of the foregoing and related ends, certain illustrative aspects of the disclosure are described herein in connection with the following description and the annexed drawings. These aspects are indicative, however, of but a few of the various ways in which the principles of the disclosure may be employed and the disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
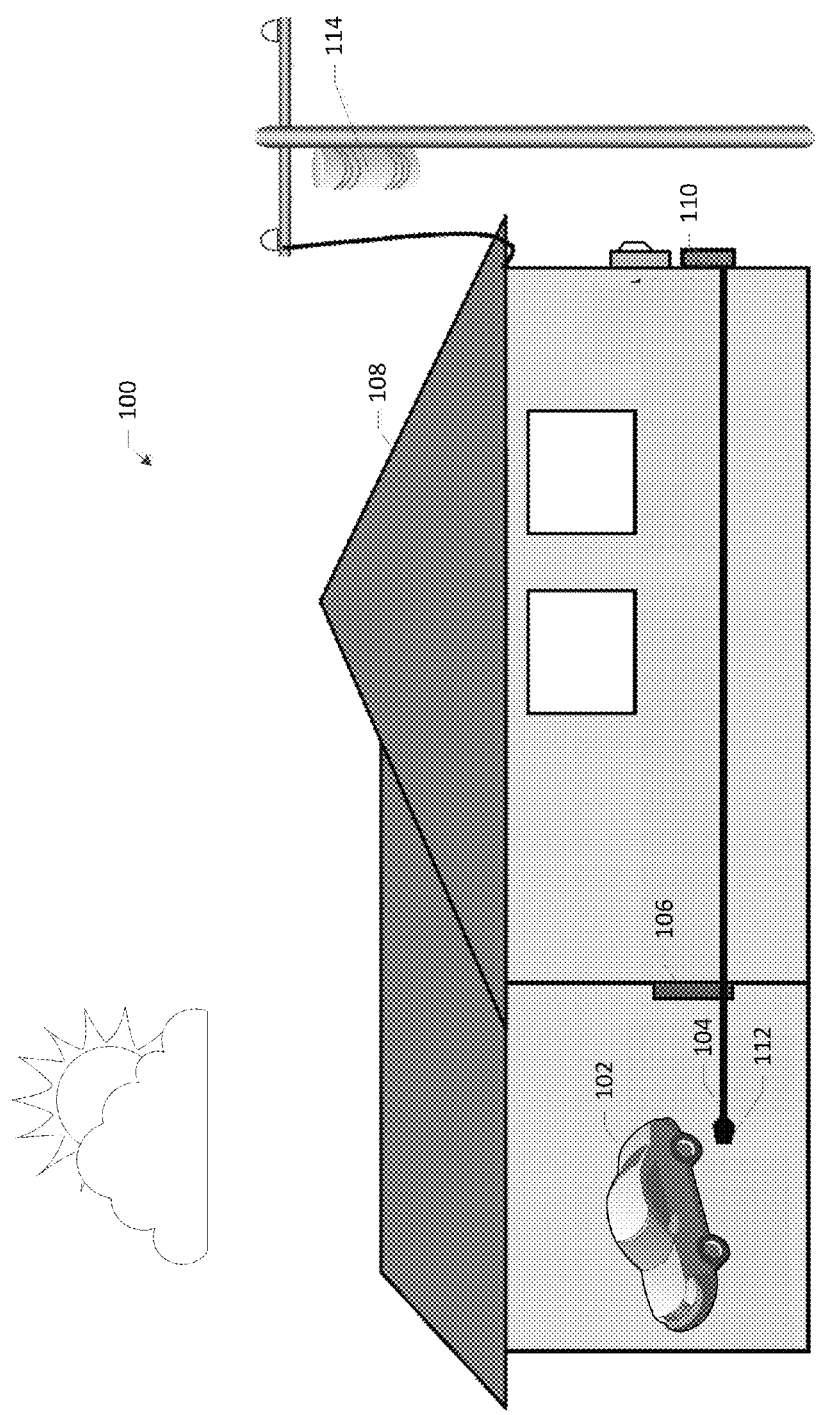
FIG. 1 is an illustration of an example system for electrical vehicle battery charging in accordance with one or more aspects of the disclosure.

The disclosure is now described with reference to the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details. In other instances, well-known structures and devices are shown in block diagram form in order to facilitate describing the disclosure.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution, and a component may be localized on one computer and/or distributed between two or more computers.

For the purposes of this disclosure, the term "electric vehicle" (EV) refers to most any vehicle that uses electricity stored in a rechargeable battery, or battery packs, to drive or contribute to driving the wheels, wherein the battery may be recharged from an external source of electricity. Further the term "electric vehicle" (EV) is intended to be inclusive of any of a "battery electric vehicle" (BEV), "plug-in hybrid electric vehicle" (PHEV) and "plug-in vehicle" (PEV). For the purposes of this disclosure, the terms EV, PEV, BEV and PHEV are used interchangeably.

For the purposes of this disclosure, the terms "vehicle owner", "vehicle operator, "driver" and "user" are used interchangeably to refer to a user of the system and method. While in many instances the vehicle owner, driver and/or user may be the same entity, it is to be appreciated that other users may make use of all or a portion of the features of the disclosed system and method.

Many factors affect the cost of providing electricity to the end user. One factor that the end user may do the most to control, is the user's contribution to how much energy is being used. Different types of customers use different amounts of energy at different times of the day or days of the week. For example, many small commercial users are closed on weekends, while many residential customers might use even more energy over the weekend than they do during the week.

Electric utilities develop and maintain average hourly load profiles for "typical" customers, representing broad customer classes. For example, a utility may make load profile data for residential, agricultural, industrial and commercial territories available to the public. The profiles may exhibit the pattern of average customer energy use over different hours of the day and different days of the week.

Historical load profile data may include data related to electricity demand and may include, for example, hourly kW data loads variation in the electrical load versus time. In an example historical load profile data table, rows contain data for one day, including year, month, day, day of week and twenty-four hourly average load per customer in kW usage values. Historical load profile data is available from utility companies in a variety of formats including spreadsheet, .csv files and the like. Historical load profile data may include measurements of a customer's electricity over a period of time that shows how much and when the customer uses electricity. Load profiles may be used by suppliers and transmission system operators to forecast electricity supply requirements and to determine the cost of serving a customer.

Weather also has a significant influence on energy use. During the summer, hot weather increases the demand for electricity. This may cause the utility to purchase expensive energy supplies. During the winter, cold weather will contribute to increased gas and electric usage. The average customer load profiles may be provided and updated weekly, reflecting the effects of the most recent weather conditions.

For example, the California Independent System Operator, an independent grid operator for the bulk of the state's power grid, posts current system demand and resource conditions, including any emergency stage alerts. It also posts the forecast of the next day's forecasted peak demand. Utilities may base load profiles on a statistical sample designed to represent a particular customer and rate schedule. The numbers in the profiles may be hourly average demand measure in kW for a sample of customers.

While demand response programs and other "smart grid" technologies seek to help alleviate peak demand problems, these systems depend on and include smart grid communications involving the exchange of current, real-time load and grid condition information. Such systems are generally ineffective when communication between the utility and the customer is slow or unavailable. The disclosed system and method for electric vehicle battery charging may generate charging instructions that reduce peak demand problems, based a historical load profile and historical or forecast weather data, in the absence of real-time or current electric grid or load condition information.

FIG. 1 illustrates an overview of an example system 100 for electrical vehicle battery charging. FIG. 1 includes a simplified view of a battery electric vehicle 102 and a charger 104. For the purposes of this disclosure, a charger 104 refers to any of a stand-alone battery charger or charging station, on-board battery charger integral to the vehicle, electric vehicle service equipment (EVSE) or most any other charger or charging equipment capable of charging the rechargeable battery of a battery electric vehicle 102. In accordance with an embodiment, a home charging station 106 may be mounted on a garage wall and connected to a home 108 electrical system 110. Typically, the vehicle operator connects the charger 104 to the vehicle 102 utilizing the charging system plug connector 112, when arriving home and unplugs it when ready to drive.

A battery charge request is initiated, for example, by coupling the rechargeable battery of plug-in electric vehicle 102 to the charging system plug connector 112 of the charger 104. In accordance with an embodiment, charger 104 may be an external or stand-alone charger separate and apart from the plug-in electric vehicle 102. In other embodiments, charger 104 may be "built-in", or integral, to the plug-in electric vehicle 102. In further embodiments, the charger 104 includes electric vehicle supply equipment (EVSE), or electric vehicle charge station 106 delivering electricity for the recharging the battery of plug-in electric vehicle 102. The charger 104 may be connected directly to the electrical system 110 of the home 108 utilizing a dedicated circuit. Electric service is provided by an electric service provider to the home 108 via a residential, or distribution, transformer 114.

The electric distribution system includes substations and transformers that step electricity down to levels usable by end-use customers, usually 120 VAC or 240 VAC. A residential transformer 114 is a transformer that provides the final voltage transformation in the electric power distribution system, stepping down the voltage used in the distribution lines to the level used by the customer.

Residential transformers may generally service between six and eight households. The charging of a single electric vehicle battery is unlikely to pose a challenge to a residential transformer. However, multiple electric vehicles charging simultaneously, especially during hours of peak electric demand, on the same transformer could potentially exceed the design limitations of the transformer. Data concerning the habits of electric vehicle owners indicates that residents generally tend to recharge at the same time, for example, when returning from work. This is also the time when many residents are also turning on air conditioning and other appliances.

Battery charging times may depend on several factors including the charging technology used, the state of charge and chemistry of the battery, and other conditions. Three technology classes of EV charging include Level 1, Level 2 "Overnight" and Level 3 "Fast" charging. Level 1 charging may be accomplished from a standard 120 VAC outlet and may take up to 16 hours or longer to charge a depleted battery. Level 2 charging may reduce charging time. Level 2 charging utilizes a 220 VAC fixed installation and may charge a depleted battery in 3-8 hours. Level 3 charging utilizes a 400-660 VAC fixed installation and may fully charge a depleted battery in as little as 30 minutes.

Clustering of electric vehicle chargers, that is multiple EV chargers operating simultaneously on a single residential transformer, may collectively draw a fairly high electric load. Residential transformers could exceed their design limitations if multiple chargers operate on a single transformer. A damaged transformer may result in a localized black-out or brown-out condition and would necessitate replacement of the transformer by the utility. Replacing or repairing a damaged transformer may be an expensive and time consuming undertaking considered the cost of the transformer itself and the labor involved. The disclosed system and method are useful for grid power management generally and for avoiding problems associated with multiple EV chargers operating simultaneously on a residential transformer.

Figure 2:
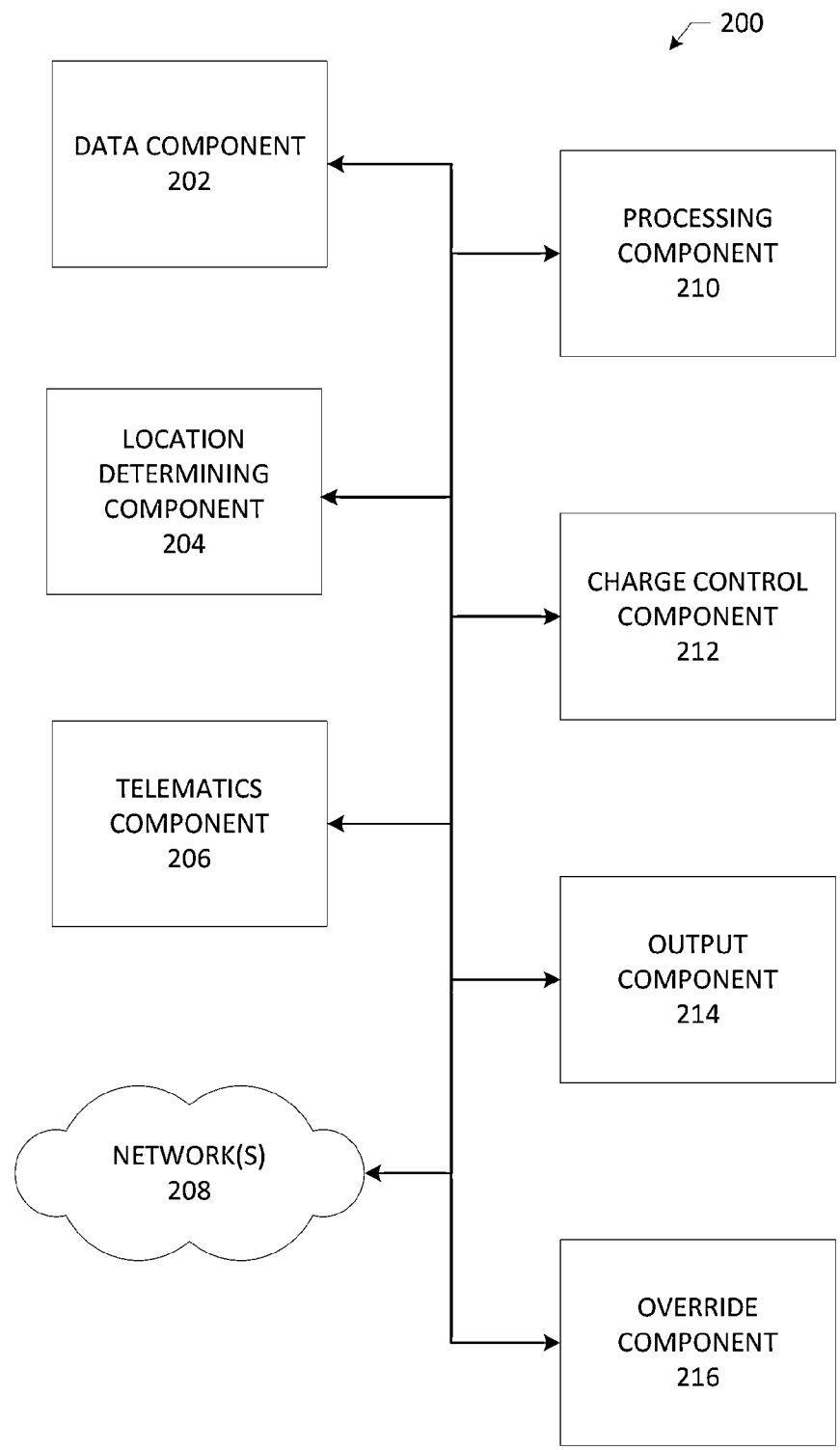
FIG. 2 is an illustration of an example system for electrical vehicle battery charging in accordance with one or more aspects of the disclosure.

FIG. 2 is an illustration of an example system 200 for electric vehicle battery charging according to one or more embodiments. The system 200 may include a data component 202, a location determining component 204, a telematics component 206, network(s) 208, a processing component 210, a charge control component 212, an output component 214 and an override component 216.

Data component 202 may be configured to receive or store data and information for use by the system 200. In an embodiment, data component 202 may receive and store information including data related to an electric vehicle, an electric vehicle rechargeable battery, battery charger, electrical vehicle service equipment (EVSE), utility demand response data, historical load profiles, time, date, location, forecast load profiles, historical weather and weather forecast information. For example, charge control component 212 may access data component 202 for data useful for generating charge instructions and notifications.

Historical load profile data may be received and stored by data component 202, for example, historical load profile data may be obtained from the appropriate utility automatically by the system 200. The system 200 may discern the appropriate historical load profile taking into account global positioning sensor data for the vehicle. Historical and forecast temperature and solar load data may be obtained from, for example, the National Weather Service or other meteorological organization or service. Solar load is the heat from the sun that is considered when identifying the total heat load on a system. In aspects, historical solar load data and forecast solar load data may be stored by data component 202 and considered when calculating charging instructions.

The system 200 may be configured to automatically obtain historic and forecast load profile and weather data for storage by data component 202. In an embodiment, the system 202 may be configured to update vehicle information, load profile and weather data on a periodic basis. For example, the data may be updated hourly, daily, weekly, or monthly. The system 200 may be configured to access data in most any manner compatible with the system. For example, the system may be connected to networks 208. Data component 202 may be local to the vehicle and the charging equipment, may be remotely located on the user's premises, or otherwise remotely located, for example, utilizing cloud storage or a data server connected to the Internet.

Location determining component 204 may include most any components for obtaining and providing location related information, including but not limited to, global positioning sensor (GPS) antenna, GPS receiver for receiving signals from GPS satellites and detecting location, databases and database information and other associated hardware and software components. Location information related to vehicle 102 may be used by the system to identify, for example, appropriate historical load profile data, forecast load profile data, historical weather data and weather forecast data. In an embodiment, appropriate residential load profile data and local weather data are identified based on location data provided by location determining component 204.

The telematics component 206 may be configured to transmit vehicle information and other data to a third party, by way of a telematics channel, for example. Vehicle information may be passed from data component 202 over one or more networks 208, for example a controller area network (CAN), to the telematics component 206 for transmission. The third party may analyze the vehicle information, historical load profile data and weather data and generate charging instructions via a charge control component 212. The telematics component 206 may be configured to receive charging instructions from the third party. Charging instructions may be provided to the battery charger or EVSE, for example, via output component 214.

In accordance with an embodiment, vehicle information passed from data component 202 to charge control component 214 without the use of telematics component 206, and charging instructions are generated locally rather than by a third party. Vehicle information may include, but is not limited to, vehicle location, time of day, date, charger characteristics, charger capacity, battery capacity, battery state of charge and the like.

System 200 may include network(s) 208, for example, a home area network (HAN), controller area network (CAN), the Internet, an intranet and advanced metering infrastructure network (AMI). The system 200 may access the Internet to obtain, for example, historical load profile data, forecast load profile data, historical weather data, weather forecast data and other data for use by the system 200.

Generally, a vehicle may have one or more components, systems, units, sensors, or controller area networks (CANs), etc. A controller area network (CAN) may be configured to share information or enable connectivity between components of a vehicle and the system 200. These components often have one or more corresponding parameters. For example, the electrical system of an electric vehicle may be associated with one or more rechargeable battery conditions, such as battery state of charge, battery capacity, etc.

The system may be configured to include networks 208, for example, a home area network (HAN). A residential local area network may be used for communication between the components of system 200 and other devices within the vicinity of the home. In accordance with an embodiment, the system 200 may be configured to communicate with the battery charger, or EVSE, via a home area network (HAN).

In an aspect, a utility provider may electronically communicate for purposes including automatic meter reading, demand response communications, smart-grid applications and outage reporting. The utility may communicate with a meter, and one or more computing devices through a communications network such as an advanced metering infrastructure (AMI) network, which may be wired, wireless or a combination of wired and wireless.

Processing component 210 may receive information from data component 202, location determining component 204, and other components of system 200, for processing. For example, vehicle information, location, time and date information may be used by processing component 210 to access historical load profile data, forecast load profile data, historical weather data, and weather forecast data, for example, via networks 208 for storage by data component 202. In an embodiment, processing component 210 may identify appropriate residential load profile data and local weather data based on location data provided by location determining component 204.

Processing component 210 may be configured to access vehicle information, historical load profile data, forecast load profile data, historical weather data, and weather forecast data periodically for storage by data component 202. In an aspect, all or a portion of the data stored by data component 202 may be updated periodically, for example, hourly, weekly or monthly.

Weather data may include most any weather-related data, for example, temperature data, forecast temperature data, solar load data, forecast solar load data and the like. Weather data may include present condition information and forecast data. Forecast data may include, for example, short range weather forecast, local weather forecast, hourly or daily forecasts, monthly and seasonal forecasts. Weather-related forecast data may include daily maximum and minimum temperatures and anomalies for the forecast period, degree day outlooks and "probability of exceedance" outlooks. Degree day outlooks include cooling and heating degree day data, for example, given as population-weighted state, regional, and national averages. In aspects, a "probability of exceedance" outlook provides the probability that a temperature quantity will be exceeded at a particular location for the given season at the given time for a month to a year.

Processing component 210 may be configured to receive information related to the charging of an electric vehicle rechargeable battery and may generate a notification. A notification may be received by the output component 214 from the processing component 210 for delivery to the vehicle owner.

Charge control component 212 may receive information from, for example, data component 202, processing component 210 and other components of system 200 for processing and for generating battery charging instructions. In aspects, charge control component 212 receives vehicle information, a historical load profile, historical temperature data and historical solar load data from data component 202 and generates charge instructions based on the data.

Output component 214 is capable of receiving input from the charge control component 212 and may provide charge instructions, notifications, audio, visual or other output in response. The output component 214 may be configured to output charging instructions to a battery charging or other electric vehicle service equipment (EVSE).

Output component 214 may be configured to receive notifications from the processing component 210 and the charge control component 212 and to provide notifications to the vehicle owner. Notifications may include sending battery charging information (e.g. information related to the charging of the rechargeable battery) to the vehicle owner or user, for example, an email, a text message, voicemail, video message, multimedia message, social media message, audio communication or visual indicator.

In accordance with an embodiment, the system 200 may be configured to respond to a request for information. For example, a user may send a request via network 208 to the system 200 for information, for example, battery state of charge, time left to full charge, status of charging (e.g. fast charging, trickle charging, charge complete, charge delayed, etc.). The system 200 may respond to the user request providing information via the output component 214.

The system 200 may include an override component 216 for user control of battery charging or for overriding the charge instructions generated by the charge control component 212. The user may manually control charging of the battery allowing, delaying, reducing or preventing battery charging regardless of the charge instructions. For example, the system may generate charge instructions that prevent the battery from charging. The user may access the override component 216 to override, or supersede, the charging instructions to cause the battery to charge. In other embodiments, the user may delay, reduce, prevent or otherwise control battery charging when or if the charging instructions indicate otherwise.

The override component 216 may be implemented in hardware or software, or a hardware/software combination. For example, the override component 216 may include a switch at the charger or EVSE that allows for manual control of battery charging. In an embodiment, the override component 216 may include software for generating alternate charging instructions for allowing, delaying, reducing or stopping battery charging as desired by the user.

Figure 3:
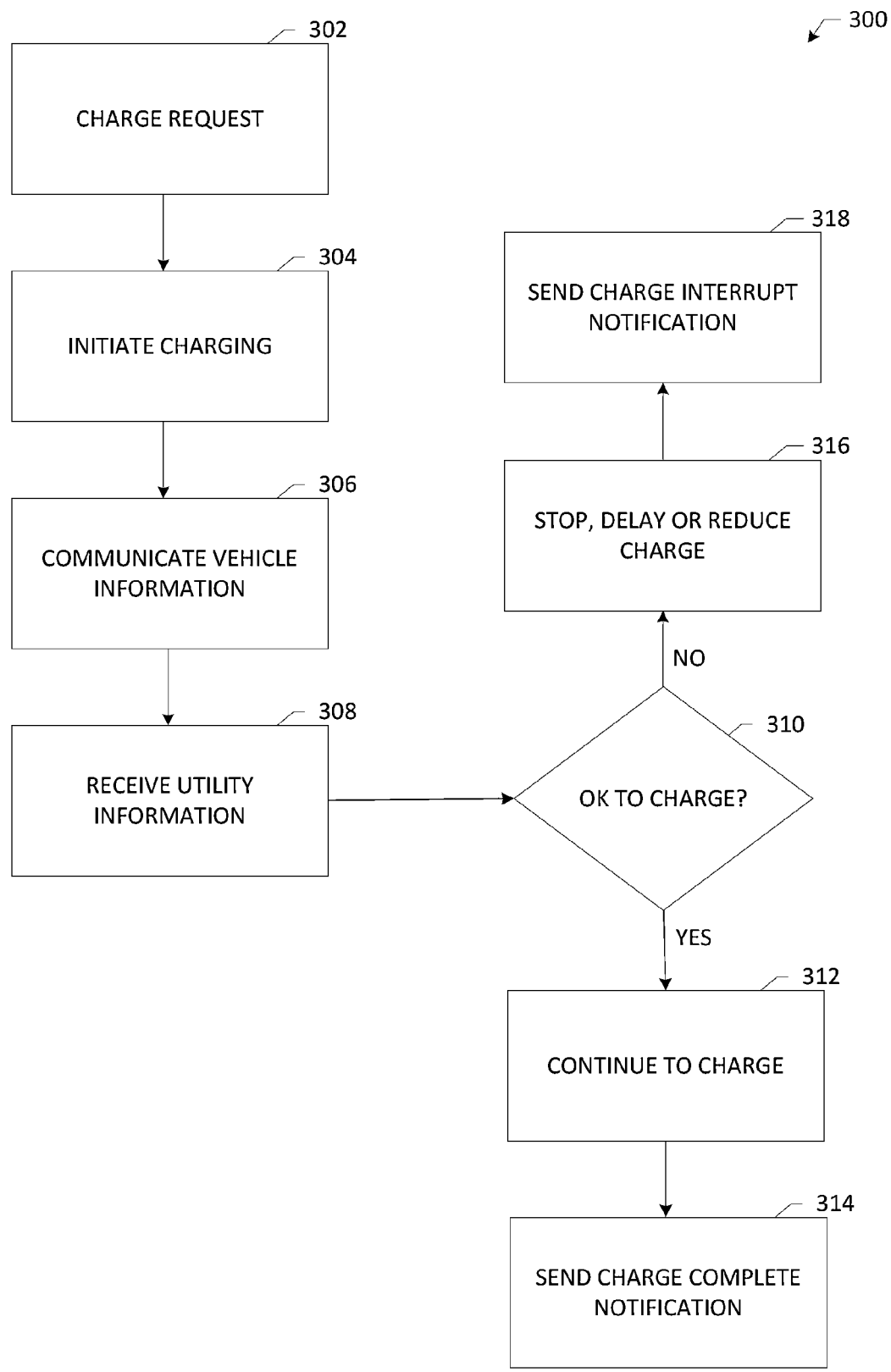
FIG. 3 is an illustration of an example flow chart of a method for electrical vehicle battery charging, according to one or more embodiments.

FIG. 3 illustrates a computer implemented method 300 of electric vehicle battery charging in accordance with aspects of the disclosure. While, for purposes of simplicity of explanation, the one or more methodologies shown herein, e.g., in the form of a flow chart, are shown and described as a series of acts, it is to be understood and appreciated that the disclosure is not limited by the order of acts, as one or more acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. One or more acts described in connection with an embodiment may be combined with acts described in connection with other embodiments. Moreover, not all illustrated acts may be required to implement a methodology in accordance with the disclosure.

Method 300 may begin at 302 by receiving a user intiated charge request. For example, the system 200 receives a user request for charging an electric vehicle battery. In accordance with an embodiment, the charge request may be initiated by connecting, or plugging, an electric vehicle into a charger. In an embodiment, a charge request may be initiated by the user utilizing a pushbutton, switch or other physical component associated with the vehicle or the charger, or through the use of a software application, such as a mobile app. A charge request may automatically be initiated by the system 200 based on a predetermined set of conditions, for example, the charger is connected to the vehicle and the battery state of charge is less than a predetermined value. At 304, the system begins charging the rechargeable battery and electricity flows through the charger to the vehicle battery.

At act 306, the system communicates vehicle information to the processing component 204. Vehicle information may include, but is not limited to, vehicle location, time of day, date, charger characteristics, charger capacity, battery capacity, battery state of charge and the like. Components of a vehicle, such as a system, unit or sensor may be connected via one or more connections or one or more CANs. Information or data pertaining to or associated with vehicle components, systems, units, sensors, the rechargeable battery, the charger and/or charging equipment may be collected and communicated to the system. For example, vehicle location information may be gathered from global positioning sensors (GPS) associated with the vehicle. Vehicle information may be used to calculate, for example, an estimated charge time in minutes, and a charge amount in watt hours (Wh).

At 308, the system receives information from the electric utility or electric service provider. At act 310, a decision of whether to continue charging the battery is made based on the vehicle information 306 and the utility information 308. In an embodiment, the decision whether to continue battery charging 310 is based on real-time electric load profile information, an estimated charge time and charge amount.

When the battery charging decision 310 is "YES", charging of the battery continues 312 and the battery proceeds to charge. In aspects, the battery is allowed to fully charge. At act 314, a notification is sent to the user informing the user that the battery charging has completed. Sending a charge complete notification 314 may include sending battery charging information (e.g. information related to the charging of the rechargeable battery) to the vehicle owner or user, for example, an email, a text message, voicemail, video message, multimedia message, social media message, audio communication or visual indicator.

When the battery charging decision 310 is "NO", charging of the battery may be stopped, reduced or delayed 316. At act 318, a notification is sent to the user informing the user that charging of the battery has been stopped, reduced or delayed. Battery charging may be interrupted or stopped completely, may be reduced, for example, to trickle charge or may be delayed by a period of time after which the system may cause the charging to commence again. Sending a charge interrupt notification 314 may include sending battery charging information (e.g. information related to the charging of the rechargeable battery) to the vehicle owner or user, for example, an email, a text message, voicemail, video message, multimedia message, social media message, audio communication or visual indicator.

Figure 4:
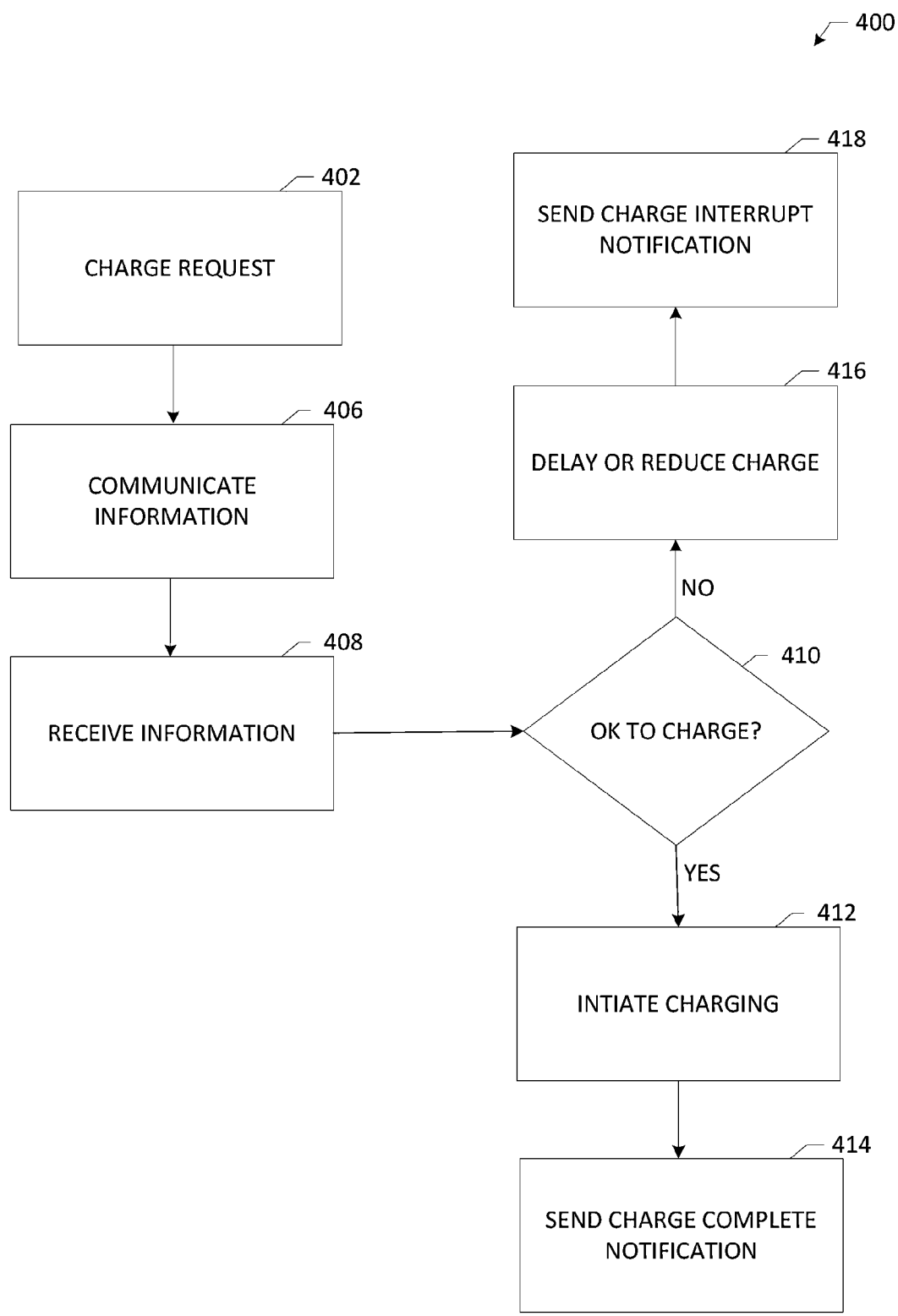
FIG. 4 is an illustration of an example flow chart of a method for electrical vehicle battery charging, according to one or more embodiments.

FIG. 4 illustrates a computer implemented method 400 of electric vehicle battery charging in accordance with aspects of the disclosure. The disclosure is not limited by the order of acts, as one or more acts may, in accordance with the disclosure, occur in a different order and/or concurrently with other acts from that shown and described herein.

Method 400 may begin at 402 by receiving a user intiated charge request. For example, the system 200 receives a user request for charging an electric vehicle battery. In accordance with an embodiment, the charge request may be initiated by connecting, or plugging, the vehicle into the charger. In an embodiment, a charge request may be initiated by the user utilizing a pushbutton, switch or other physical component associated with the vehicle or the charger, or through the use of a software application, such as a mobile app. A charge request may automatically be initiated by the system 200 based on a predetermined set of conditions, for example, the charger is connected to the vehicle and the estimated charge time is less than a predetermined time limit. In contrast to method 300, method 400 does not begin charging the rechargeable battery upon receipt of the charging request.

At act 406, the system communicates vehicle information to the processing component 204. Vehicle information may include, but is not limited to, vehicle location, time of day, date, charger characteristics, charger capacity, battery capacity, battery state of charge and the like. Components of a vehicle, such as a system, unit or sensor may be connected via one or more connections or one or more controller area networks (CANs). Information or data pertaining to or associated with vehicle components, systems, units, sensors, the rechargeable battery, the charger and/or charging equipment may be collected and communicated to the system. For example, vehicle location information may be gathered from global positioning sensors associated with the vehicle. Vehicle information may be used to calculate, for example, an estimated charge time in minutes, and a charge amount in watt hours (Wh).

At 408, the system receives information from the electric utility or electric service provider. At act 410, a decision of whether to continue charging the battery is made based on the vehicle information 406 and the utility information 408. In an embodiment, the decision whether to continue battery charging 410 is based on real-time electric load profile r grid condition information, an estimated charge time and charge amount in kWh.

When the battery charging decision 410 is "YES", charging of the battery is initiated 412, and the battery begins to charge. In aspects, the battery is allowed to fully charge. At act 414, a notification is sent to the user informing the user that the battery charge has completed. Sending a charge complete notification 414 may include sending battery charging information (e.g. information related to the charging of the rechargeable battery) to the vehicle owner or user, for example, an email, a text message, voicemail, video message, multimedia message, social media message, audio communication or visual indicator.

When the battery charging decision 410 is "NO", charging of the battery may be prevented, initiated at a reduced charging level or delayed 416. At act 418, a notification is sent to the user informing the user that charging of the battery has been prevented, reduced or delayed. Battery charging may be prevented completely, may be reduced, for example, to a trickle charge or may be delayed by a period of time after which charging may commence again. Sending a charge interrupt notification 414 may include sending battery charging information (e.g. information related to the charging of the rechargeable battery) to the vehicle owner or user, for example, an email, a text message, voicemail, video message, multimedia message, social media message, audio communication or visual indicator.

Figure 5:
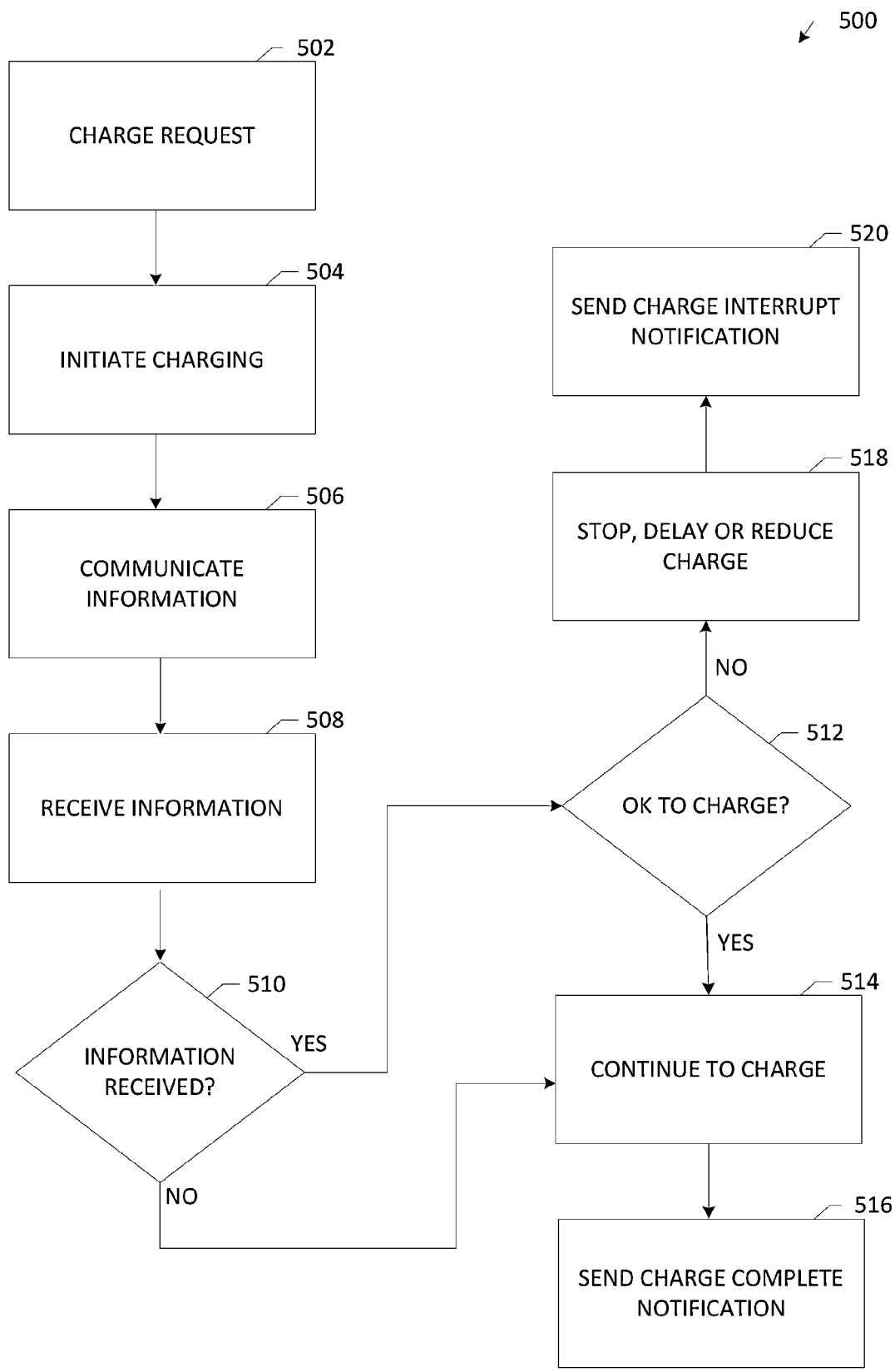
FIG. 5 is an illustration of an example flow chart of a method for electrical vehicle battery charging, according to one or more embodiments.

FIG. 5 illustrates a computer implemented method 500 of electric vehicle battery charging in accordance with aspects of the disclosure. Those skilled in the art will understand and appreciate that the methodology could alternatively be represented as a series of interrelated states or events, such as in a state diagram. Moreover, not all illustrated acts may be required to implement the methodology in accordance with the disclosure.

Method 500 may begin at 502 by receiving a user intiated charge request. For example, the system 200 receives a user request for charging an electric vehicle battery. In accordance with an embodiment, the charge request may the same as or similar to a charge request intiated in methods 300 and 400 discussed above. In contrast to methods 300 and 400, method 500 may provide a charging decision in the absence of communication with the electric service provider, that is, without the use of real-time electric gird or load information. Method 500 may provide a charging decision in the event that communications with the utility are delayed, interrupted or unavailable, or real-time communication cannot be established. At 504, the system begins charging the rechargeable battery and electricity flows through the charger to the vehicle battery in response to the charge request 502.

At act 506, the system communicates vehicle information to the processing component 204. Vehicle information may include, but is not limited to, vehicle location, time of day, date, charger characteristics, charger capacity, battery capacity, battery state of charge and the like. Components of a vehicle, such as a system, unit or sensor may be connected via one or more connections or one or more controller area networks (CANs). Information or data pertaining to or associated with vehicle components, systems, units, sensors, the rechargeable battery, the charger and/or charging equipment may be collected and communicated to the system. For example, vehicle location information may be gathered from global positioning sensors associated with the vehicle. Vehicle information may be used to calculate, for example, an estimated charge time in minutes, and a charge amount in watt hours (Wh).

At 508, the system attempts to receive information from the electric utility or electric service provider. At act 510, a decision of whether the system has received information from the utility is made. If communication with the utility is successful "YES" (e.g. the system 500 has received information from the electric service provider), a charging decision is made 512 based on the vehicle information 506 and the utility information 508. In an embodiment, the charging decision 512 is based on real-time electric load profile information, an estimated charge time and charge amount.

When the battery charging decision 512 is "YES", charging of the battery is initiated 514, and the battery begins to charge. In aspects, the battery is allowed to fully charge. At act 516, a notification is sent to the user informing the user that the battery charge has completed. Sending a charge complete notification 516 may include sending battery charging information (e.g. information related to the charging of the rechargeable battery) to the vehicle owner or user, for example, an email, a text message, voicemail, video message, multimedia message, social media message, audio communication or visual indicator.

When the battery charging decision 512 is "NO", charging of the battery may be prevented, initiated at a reduced charging level or delayed 518. At act 520, a notification is sent to the user informing the user that charging of the battery has been prevented, reduced or delayed.

In the event that communication with the utility is not successful 510 "NO" (e.g. the system 500 has not received information from the electric service provider, or is unable to exchange information with the utility), the battery is allowed to continue charging 514. A charge complete notification is sent to the user 516, for example, when battery charging has completed.

Figure 6:
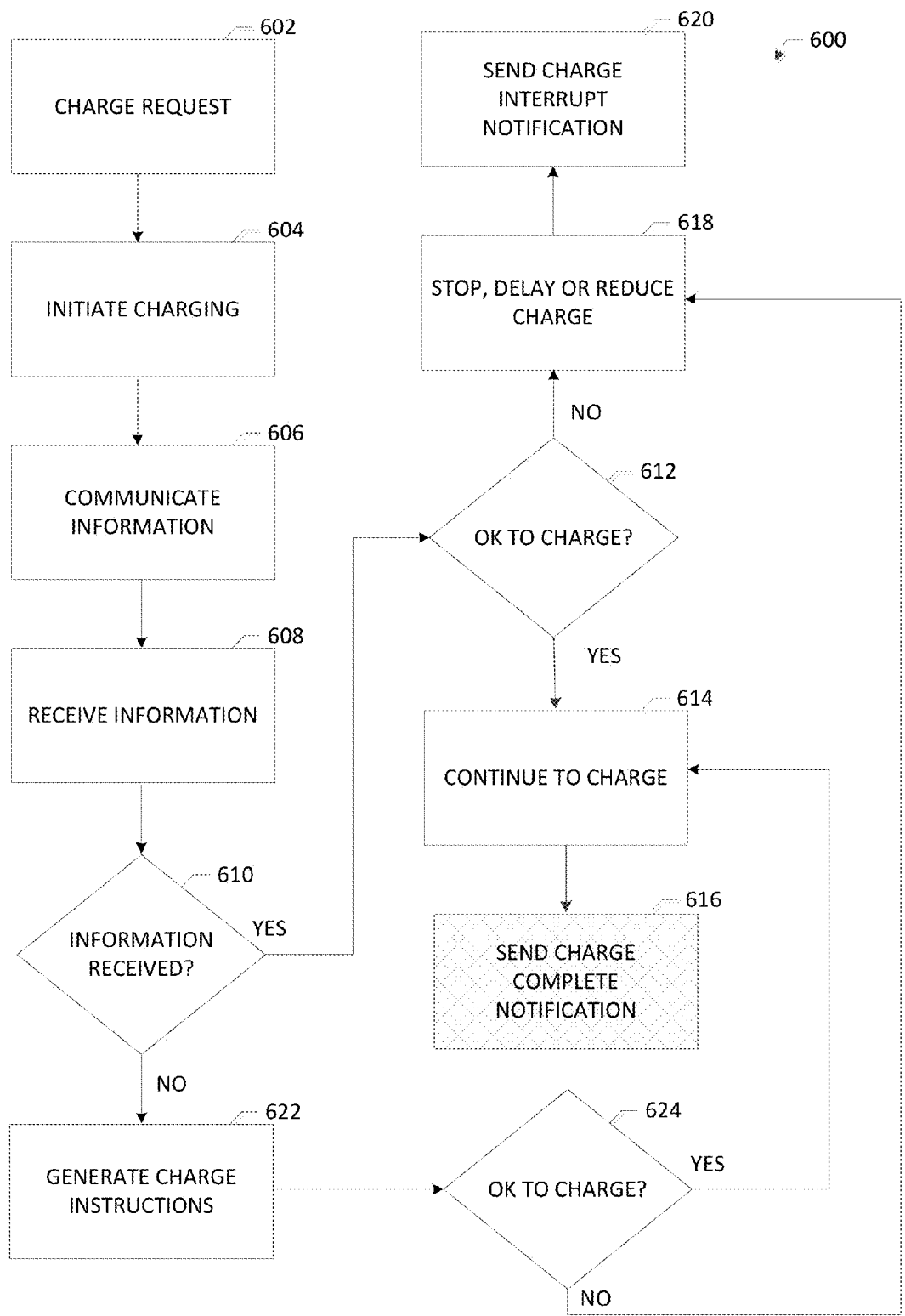
FIG. 6 is an illustration of an example flow chart of a method for electrical vehicle battery charging, according to one or more embodiments.

FIG. 6 illustrates a computer implemented method 600 of electric vehicle battery charging in accordance with aspects of the disclosure. While, for purposes of simplicity of explanation, the one or more methodologies shown herein, e.g., in the form of a flow chart, are shown and described as a series of acts, it is to be understood and appreciated that the disclosure is not limited by the order of acts, as one or more acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure.

Method 600 may begin at 602 by receiving a user intiated charge request. For example, the system 200 receives a user request for charging an electric vehicle battery. In accordance with an embodiment, the charge request may the same as or similar to a charge request intiated in any of methods 300, 400 or 500 as discussed above. In contrast to methods 300 and 400, method 600 provides a charging decision in the absence of communications with the utility or when connectivity issues prevent the exchange of real-time information with the electric service provider. Method 600 may provide a charging decision in the event that communications with the utility are delayed, interrupted or unavailable, or real-time communication with the utility cannot or has not been established. At 604, the system begins charging the rechargeable battery and electricity flows through the charger to the vehicle battery in response to the charge request 602.

At act 606, the system communicates vehicle information to the processing component 204. Vehicle information may include, but is not limited to, vehicle location, time of day, date, charger characteristics, charger capacity, battery capacity, battery state of charge and the like. Components of a vehicle, such as a system, unit or sensor may be connected via one or more connections or one or more controller area networks (CANs). Information or data pertaining to or associated with vehicle components, systems, units, sensors, the rechargeable battery, the charger and/or charging equipment may be collected and communicated to the system. For example, vehicle location information may be gathered from global positioning sensors associated with the vehicle. Vehicle information may be used to calculate, for example, an estimated charge time in minutes, and a charge amount in watt hours (Wh).

At 608, the system attempts to receive information from the electric utility or electric service provider. At act 610, a decision of whether the system has received information from the utility is made. If communication with the utility is successful "YES" (e.g. the system 500 has received information from the electric service provider), a charging decision is made 612 based on the vehicle information 606 and the utility information 608. In an embodiment, the charging decision 612 is based on real-time electric load profile information, an estimated charge time and charge amount.

When the battery charging decision 612 is "YES", charging of the battery continues 614, and the battery charges. In aspects, the battery is allowed to fully charge. At act 616, a notification is sent to the user informing the user that the battery charge has completed. Sending a charge complete notification 616 may include sending battery charging information (e.g. information related to the charging of the rechargeable battery) to the vehicle owner or user, for example, an email, a text message, voicemail, video message, multimedia message, social media message, audio communication or visual indicator.

When the battery charging decision 612 is "NO", charging of the battery may be interrupted, reduced or delayed 618. At act 620, a notification is sent to the user informing the user that charging of the battery has been interrupted, reduced or delayed. In an embodiment, the notification may include additional information related to charging of the battery, for example, battery state of charge, reason for charge interrupt, estimated charge time and the like.

In the event that communication with the utility is not successful and information is not received from the utility 610 "NO" (e.g. the system 600 has not received information from the electric service provider), charge instructions are generated 622. In an embodiment, communications or the exchange of grid condition, load information or other information with the utility may be unavailable. In aspects, real-time communications may be negatively impacted by network outages, packet loss, speed or latency problems. The generation of charge instructions 622 is detailed below in connection with FIG. 7.

When the charge instructions generated at act 622 indicate that battery charging is allowed 624 ("YES"), the battery continues to charge 614. A charge complete notification is sent to the user 616 when battery charging has completed as discussed above in connection with any of methods 300, 400 and/or 500. When the battery charging decision 624 is "NO", charging of the battery may be interrupted, reduced or delayed 618. At act 620, a notification is sent to the user informing the user that charging of the battery has been interrupted, reduced or delayed.

Figure 7:
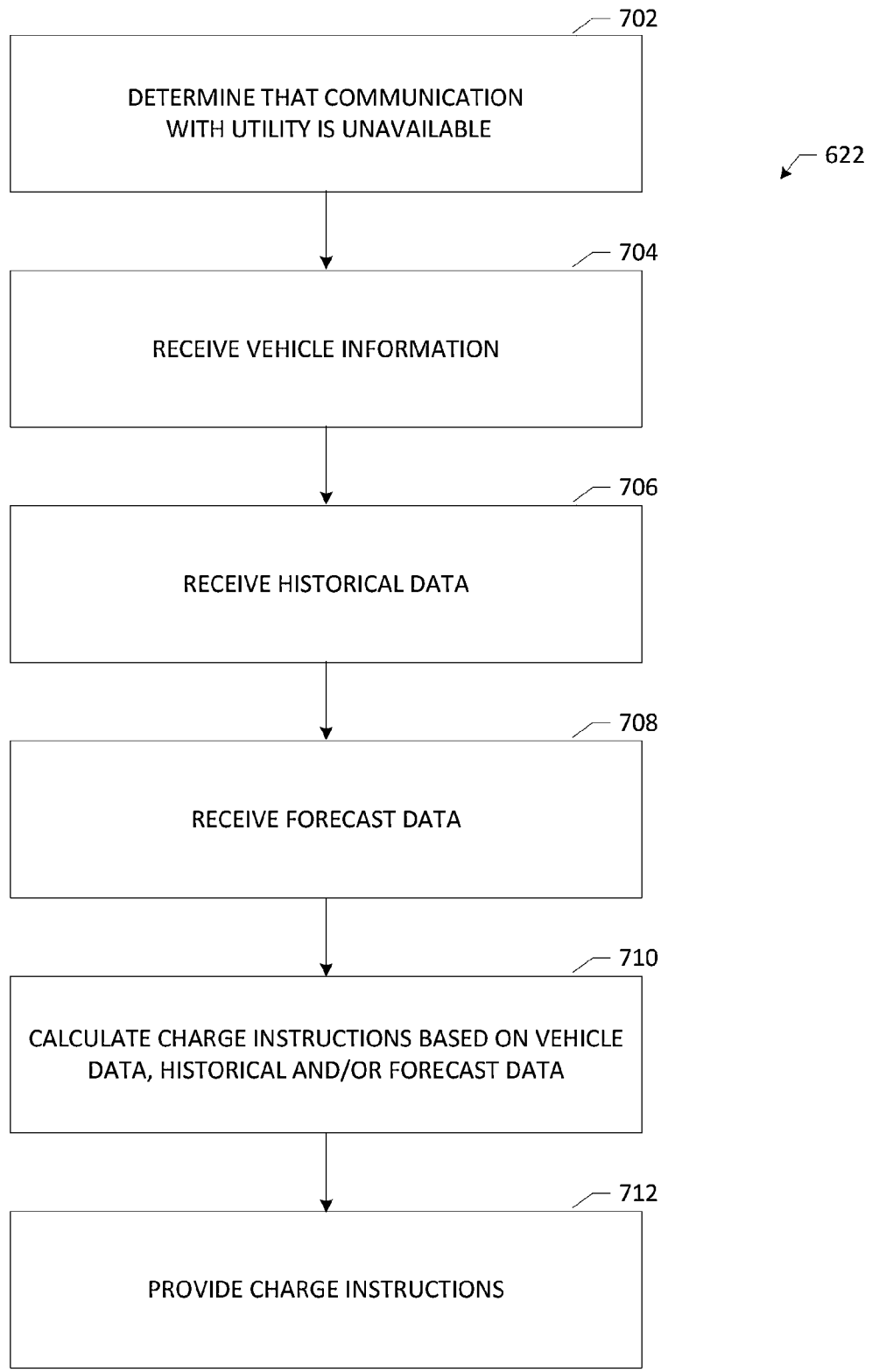
FIG. 7 is an illustration of an example flow chart of a method for electrical vehicle battery charging, according to one or more embodiments.

FIG. 7 illustrates an example block diagram of an example method for generating charge instructions 622 for charging an electric vehicle battery. At 702, methodology 622 is initiated. The system 200 attempts to establish communications with the electric service provider to send, receive or exchange data, for example, demand response data, grid condition, load information or other information. The system 200 determines that communication with the utility providing electric service at the location of the vehicle is not successful. In an embodiment, the system 200 may determine that an exchange of information with the utility has been interrupted, or that a connection attempt has timed out (e.g. no response has been received within a pre-determined time period).

When communications with the utility are unavailable 702, the method for generating charge instructions 622 proceeds to act 704. At act 704, vehicle information is received. Vehicle information may include data related to an electric vehicle, an electric vehicle rechargeable battery, battery charger, electrical vehicle service equipment (EVSE), utility demand response data, time, date and location.

At 706, historical data is received. In embodiments, historical data has been identified by processing component 210 based at least in part on time, date and location information. Historical data may include, for example, data related to historical load profiles and historical weather data. In an embodiment, historical data may be stored by data component 202 and may be accessed by charge control component 212 for use in generating the charge instructions 622.

At 708, forecast data is received. In embodiments, forecast data has been identified by processing component 210 based on time, date, location and/or other information. Forecast data may include, for example, data related to forecast load profiles and forecast weather data. In an embodiment, forecast data may be stored by data component 202 and may be accessed by charge control component 212 for use in generating the charge instructions 710.

At 710, the charging instructions are calculated. Charging instructions may be calculated based on any of the vehicle information, historical data and/or weather data received at acts 704, 706 and/or 708.

In accordance, the charging instructions are calculated 710 based at least in part on a historical load profile and historical weather data in the absence of real-time communication with the electric service provider. A historical load profile may include any of a local, residential, regional load profile or most any other historical data indicating electric usage for the general or local area where the electric vehicle is located at the time the charging request is initiated.

Historical weather data may include any of historical temperature, solar load and other weather or climate related data for the general or local geographic area where the electric vehicle is located at the time the charging request is initiated.

In aspects, charging instructions permit charging of the rechargeable battery when historical load profile, historical temperature data and historical solar load data indicate an off-peak electricity usage condition is likely. In other aspects, charging instructions prevent, reduce or delay charging of the rechargeable battery when historical load profile, historical temperature data and historical solar load data indicate that an on-peak electricity usage condition is likely.

In further embodiments, the charging instructions are calculated 710 based at least in part on a historical load profile and historical weather data in the absence of real-time communication with the electric service provider. Charging instructions may be based on forecast weather data instead of historical weather data when the forecast weather data differs from the historical weather data. For example, charging instructions may be based on forecast temperature data rather than historical temperature data when the forecast weather data varies from the historical weather data by 2% or more.

In accordance with an embodiment, the charging instructions are calculated 710 based at least in part on a forecast load profile and forecast weather data in the absence of real-time communication with the electric service provider.

In an embodiment, an on-peak condition refers to a period of relatively high demand for electrical energy. Off-peak may refer to periods of time when demand is other than on-peak. For example, an on-peak period may include weekdays from 4 p.m. to 8 p.m., May through October.

In accordance with an embodiment, charging instructions permit charging of the rechargeable battery when historical load profile, forecast temperature data and/or forecast solar load data indicate that electricity usage will be at less than peak levels for the time period involved in recharging the electric vehicle battery. In other aspects, charging instructions prevent, reduce or delay charging of the rechargeable battery when historical load profile, historical temperature data and historical solar load data indicate that electricity usage is at peak levels and will remain so for several hours.

Charging instructions may include instructions that delay charging of the electric vehicle battery when any of the historical or forecast load profile data or the historical or forecast weather data indicate a peak period of electricity usage followed by an off-peak period. For example, a vehicle owner may arrive home from work at 6:00 pm and initiate a charge request. Based on a historical residential load profile and forecast temperature data, the system 200 calculates that a current peak energy usage period will likely be followed by an off-peak period in five hours. The system 200 generates charging instructions 622 that allow the electric vehicle battery to commence charging at a time (e.g. 11:00 pm) when the system has calculated that energy usage will be lower thereby avoiding difficulties associated with overload conditions of the local residential transformer and the power grid overall.

In an embodiment, charging instruction may be calculated 710 based on data related to one or more electric vehicles connected to the same residential transformer. The charging of multiple electric vehicles connected to a single residential transformer may be coordinated so as to avoid overloading or damaging the transformer.

At act 712 the charging instructions calculated at act 710 are provided, for example, to a battery charger, electric vehicle service equipment (EVSE) or other device or system capable of controlling charging of the electric vehicle rechargeable battery.

Figure 8:
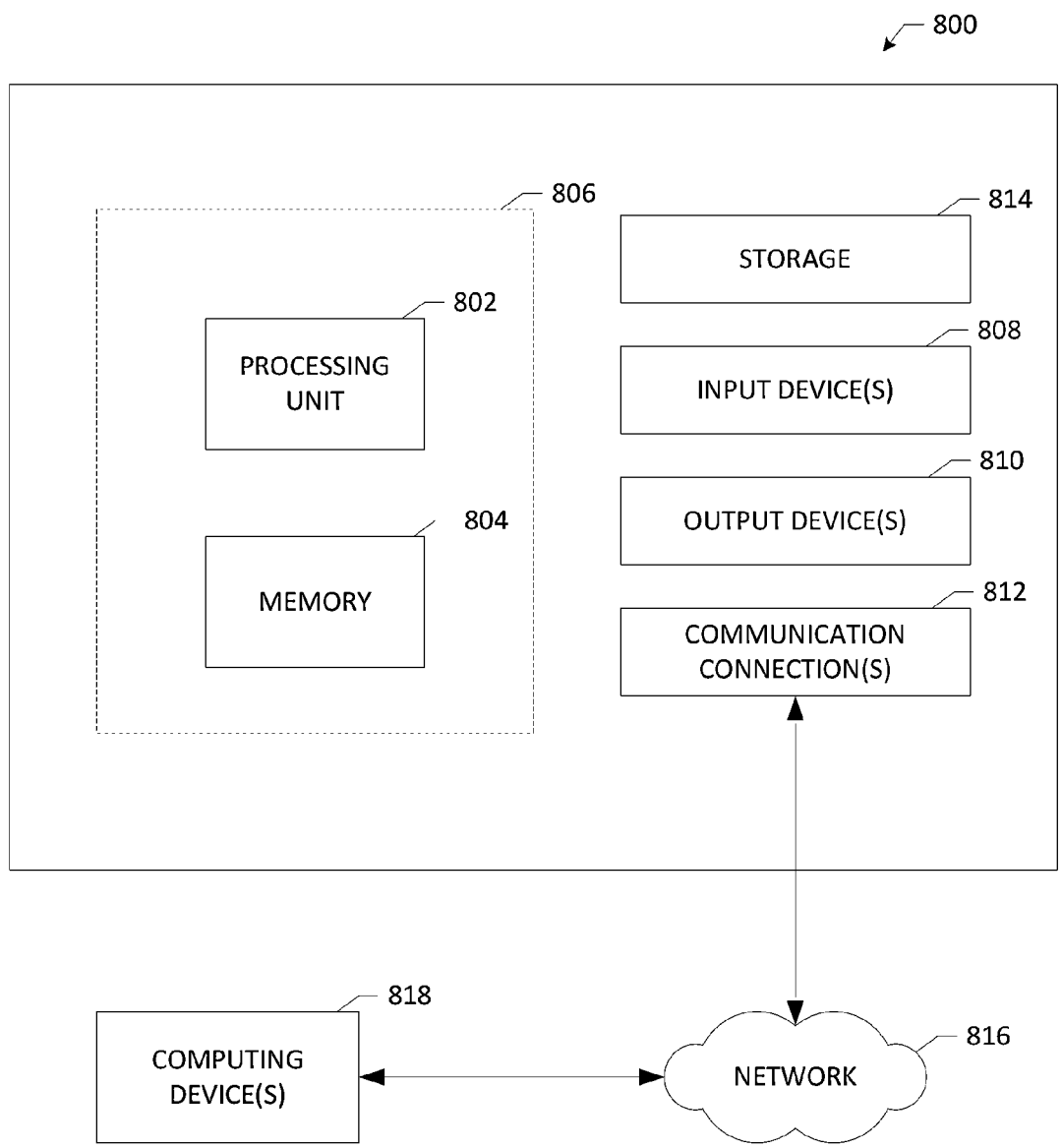
FIG. 8 is an illustration of an example computing environment where one or more of the provisions set forth herein are implemented, according to one or more embodiments.

FIG. 8 and the following discussion provide a description of a system and suitable computing environment in which embodiments of one or more of the provisions set forth herein may be implemented.

FIG. 8 illustrates a system 800 including a computing device configured to implement one or more embodiments provided herein. In one configuration, the computing device may include at least one processing unit 802 and memory 804. Depending on the configuration and type of computing device, memory 804 may be volatile, such as RAM, non-volatile, such as ROM, flash memory, etc., or a combination of the two. This configuration is illustrated in FIG. 8 by dashed line 806.

The system 800 may include one or more input devices 808 such as keyboard, mouse, pen, audio or voice input device, touch input device, infrared cameras, video input devices, gesture recognition module, or any other input device.

In embodiments, the system 800 may include additional input devices 808 to receive input from a user. User input devices 808 may include, for example, a push button, touch pad, touch screen, wheel, joystick, keyboard, mouse, keypad, or most any other such device or element whereby a user may input a command to the system. Input devices may include a microphone or other audio capture element that accepts voice or other audio commands. For example, a system might not include any buttons at all, but might be controlled only through a combination of gestures and audio commands, such that a user may control the system without having to be in physical contact with the system.

One or more output devices 810 such as one or more displays or most any other output device may be included in system 800. The one or more input devices 808 and/or one or more output devices 810 may be connected to system 800 via a wired connection, wireless connection, or any combination thereof. System 800 may also include one or more communication connections 812 that may facilitate communications with one or more devices including computing devices 818 by means of a communications network 816.

Communications network 816 may be wired, wireless, or any combination thereof, and may include ad hoc networks, intranets, the Internet, or most any other communications network that may allow system 800 to communicate with computing device 818.

Example computing devices 818 include, but are not limited to, personal computers, hand-held or laptop devices, mobile devices, such as mobile phones, smart phones, Personal Digital Assistants (PDAs), wearable computers, such as Google Glass™, media players, tablets, and the like, multiprocessor systems, consumer electronics, mini computers, distributed computing environments that include most any of the above systems or devices, and the like. Although computing device 818 may be a smart phone for certain users of system 800, computing device 818 may be substantially any computing device, which may include, for example, tablets (e.g. Kindle®, Nook®, Galaxy Note®, iPad®, etc.), cellular/smart phones or PDAs (e.g., Android®, iPhone®, Blackberry®, Palm®, etc.).

The operating environment of FIG. 8 is one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" or modules being executed by one or more computing devices. Computer readable instructions are distributed via computer readable media as will be discussed below. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In these or other embodiments, system 800 may include additional features or functionality. For example, system 800 may also include additional storage such as removable storage or non-removable storage, including, but not limited to, magnetic storage, optical storage, and the like. Such additional storage is illustrated in FIG. 8 by storage 814. In certain embodiments, computer readable instructions to implement one or more embodiments provided herein are in storage 814. Storage 814 may also store other computer readable instructions to implement an operating system, an application program, and the like. Computer readable instructions may be loaded in memory 804 for execution by processing unit 802, for example.

In an aspect, the term "computer readable media" includes computer storage media. Computer storage media includes volatile and nonvolatile, removable and non-removable media implemented in any method or technology for storage of information such as computer readable instructions or other data. Memory 804 and storage 814 are examples of computer storage media. Computer storage media includes, but is not limited to, RAM, ROM, EEPROM, flash memory or other memory technology, CD-ROM, Digital Versatile Disks (DVDs) or other optical storage, cloud storage, data server connected to the Internet or most any other medium which may be used to store the desired information and which may be accessed by the computing device of system 800. Any such storage media may be part of system 800.

In an embodiment, computer-readable medium includes processor-executable instructions configured to implement one or more embodiments of the techniques presented herein. Computer-readable data, such as binary data including a plurality of zero's and one's, in turn includes a set of computer instructions configured to operate according to one or more of the principles set forth herein. In one such embodiment, the processor-executable computer instructions is configured to perform a method, such as at least a portion of one or more of the methods described in connection with embodiments disclosed herein. In another embodiment, the processor-executable instructions are configured to implement a system, such as at least a portion of one or more of the systems described in connection with embodiments disclosed herein. Many such computer-readable media may be devised by those of ordinary skill in the art that are configured to operate in accordance with the techniques presented herein.

The term computer readable media includes most any communication media. Communication media typically embodies computer readable instructions or other data in a "modulated data signal" such as a carrier wave or other transport mechanism and includes any information delivery media.

What has been described above includes examples of the disclosure. It is, of course, not possible to describe every conceivable combination of components or methodologies for purposes of describing the disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for charging a battery of an electric vehicle, comprising:
   coupling the battery of the electric vehicle to a power source utilizing a charger;
   utilizing one or more processors and memory storing one or more programs for execution by the one or more processors, the one or more programs including instructions for:
      i) receiving a historical load profile or historical weather data; and
      ii) generating charge instructions based on the historical load profile or historical weather data, wherein the charge instructions are generated in absence of real-time electric grid load data; and
   providing the charge instructions to the charger.

2. The method for charging a battery of an electric vehicle of claim 1, including receiving vehicle data, wherein the vehicle data comprises vehicle location, battery capacity, battery state of charge, time of day, date, charger characteristics or charger capacity.

3. The method for charging a battery of an electric vehicle of claim 2, wherein receiving the historical load profile or historical weather data comprises receiving a historical residential load profile or historical local weather data based on the vehicle location.

4. The method for charging a battery of an electric vehicle of claim 1, wherein receiving historical weather data includes receiving historical temperature data and historical solar load data.

5. The method for charging a battery of an electric vehicle of claim 1, comprising:
   receiving weather forecast data; and
   generating charge instructions based on the weather forecast data instead of the historical weather data when the weather forecast data varies from historical weather data by 2% or more.

6. The method for charging a battery of an electric vehicle of claim 1, including generating and providing charge instructions preventing battery charging when the historical load profile or historical weather data indicate an on-peak condition.

7. The method for charging a battery of an electric vehicle of claim 1, including generating and providing charge instructions allowing battery charging when the historical load profile or historical weather data indicate an off-peak condition.

8. The method for charging a battery of an electric vehicle of claim 1, including generating a notification comprising battery charging related information.

9. The method for charging a battery of an electric vehicle of claim 8, wherein generating a notification comprising battery charging information comprises generating an email, a text message, voicemail, video message, multimedia message, social media message, audio communication or visual indicator.

10. An electric vehicle battery charging system, comprising:
    a battery charger coupled to a power source for supplying power to a rechargeable battery of an electric vehicle;
    a database component including a historical load profile and historical weather data;
    a charging control component in communication with the battery charger and the database;
    charging instructions generated by the charging control component and provided to the battery charger, wherein the charging instructions are based on the historical load profile and the historical weather data, and wherein the charging control component determines the charging instructions in absence of current electrical grid load condition data.

11. The electric vehicle battery charging system of claim 10, wherein the historical weather data comprises local weather data based on a location of the electric vehicle.

12. The electric vehicle battery charging system of claim 10, wherein the historical load profile comprises a residential load profile based on a location of the electric vehicle.

13. The electric vehicle battery charging system of claim 10, wherein the charging instructions are based on forecast weather data instead of the historical weather data when the forecast weather data varies from the historical weather data by 2% or more.

14. The electric vehicle battery charging system of claim 10, wherein the charging instructions
    permit charging of the rechargeable battery when the historical load profile, historical temperature data or historical solar load data indicate an off-peak condition;
    prevent charging of the rechargeable battery when the historical load profile, historical temperature data or historical solar load data indicate an on-peak condition; and
    delay charging of the rechargeable battery when the historical load profile, historical temperature data or historical solar load data indicate an on-peak condition followed by an off-peak condition.

15. The electric vehicle battery charging system of claim 10, including an output component for providing a notification to a vehicle owner, wherein the notification includes information related to the charging of the rechargeable battery.

16. The electric vehicle battery charging system of claim 15, wherein the notification comprises an email, a text message, voicemail, video message, multimedia message, social media message, audio communication or visual indicator.

17. The electric vehicle battery charging system of claim 10, comprising an override component that provides manual control for charging of the rechargeable battery.

18. A method for charging an electric vehicle battery, comprising:
    coupling the electric vehicle battery to a power source utilizing a charger;

utilizing one or more processors and memory storing one or more programs for execution by the one or more processors, the one or more programs including instructions for:
- iii) receiving a forecast load profile, forecast temperature data or forecast solar load data; and
- iv) generating charge instructions based on the forecast load profile, forecast temperature data or forecast solar load data, wherein generating charge instructions includes calculating the charge instructions in absence of real-time electric grid load data; and providing the charge instructions to the charger.

19. The method for charging an electric vehicle battery of claim 18, including:
- receiving vehicle data, wherein the vehicle data comprises vehicle location, battery capacity, battery state of charge, time of day, date, charger characteristics or charger capacity; and
- generating charge instructions based on the forecast load profile, forecast temperature data or forecast solar load data and the vehicle data.

\* \* \* \* \*